E. P. TERRELL & J. FOOS.
CORN-PLANTERS.
No. 195,418. Patented Sept. 18, 1877.
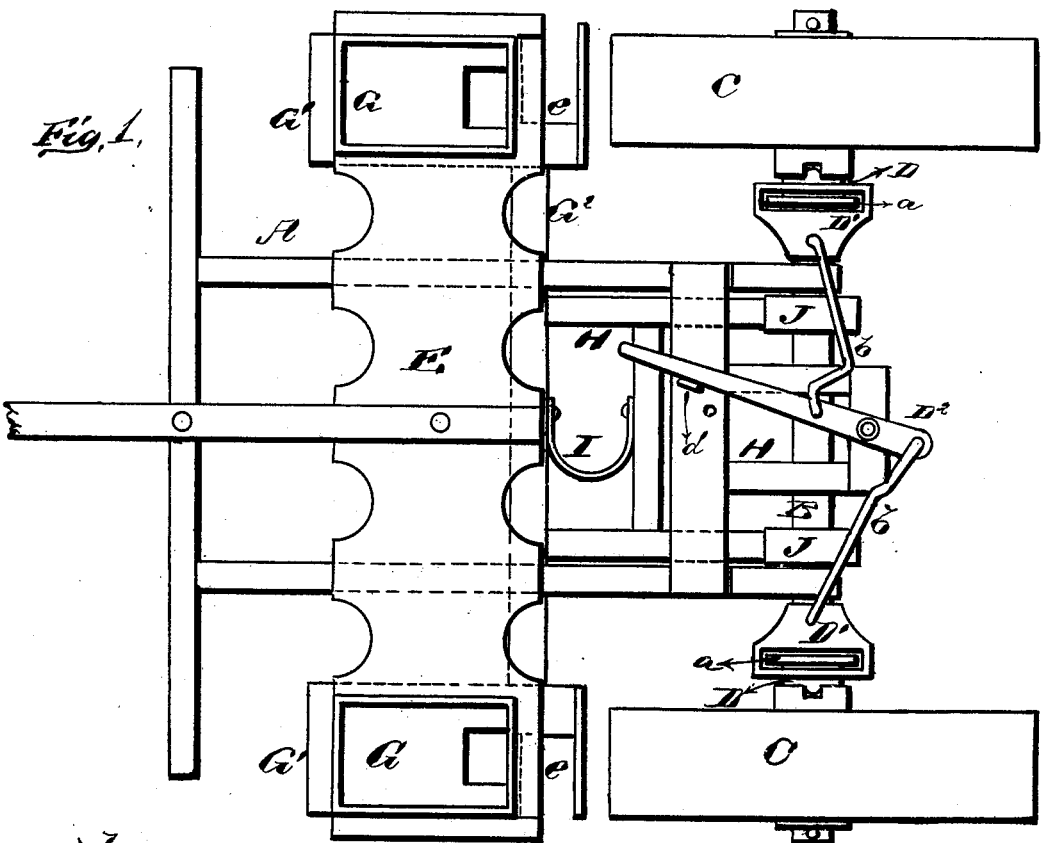
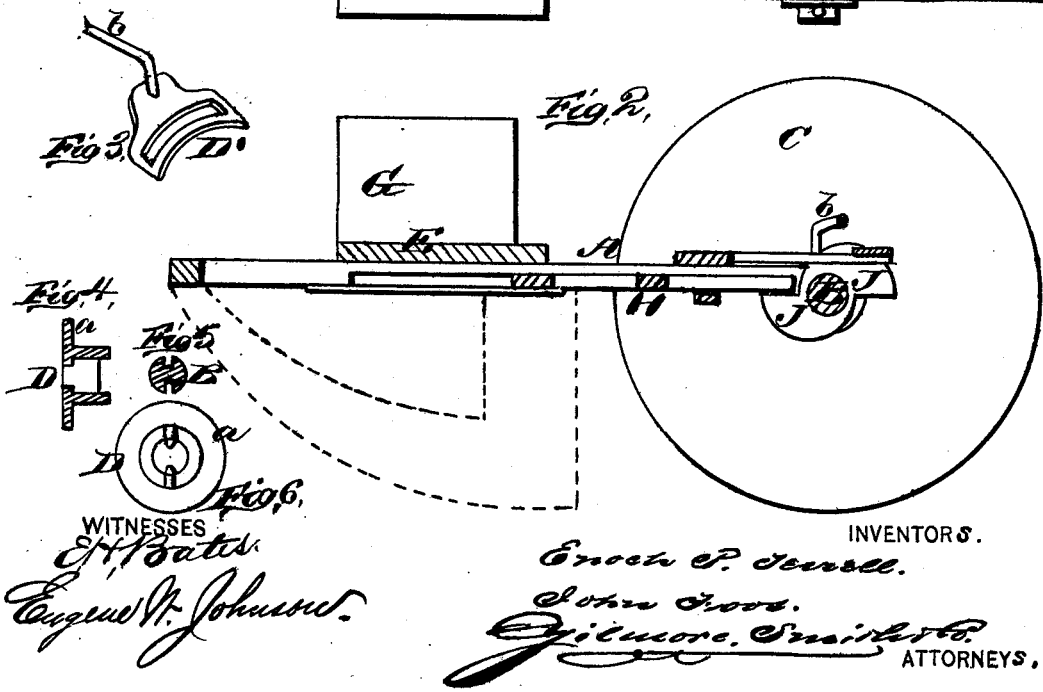
WITNESSES
INVENTORS.

UNITED STATES PATENT OFFICE.

ENOCH P. TERRELL AND JOHN FOOS, OF BELLEFONTAINE, OHIO.

IMPROVEMENT IN CORN-PLANTERS.

Specification forming part of Letters Patent No. 195,418, dated September 18, 1877; application filed May 26, 1877.

*To all whom it may concern:*

Be it known that we, ENOCH P. TERRELL and JOHN FOOS, of Bellefontaine, in the county of Logan and State of Ohio, have invented a new and valuable Improvement in Corn-Planters; and we do hereby declare that the following is a full, clear, and exact description of the construction and operation of the same, reference being had to the annexed drawings, making a part of this specification, and to the letters and figures of reference marked thereon.

Figure 1 of the drawings is a representation of a plan view of our corn-planter. Fig. 2 is longitudinal vertical sectional view, and Figs. 3, 4, 5, and 6 are details of the same.

The nature of our invention consists in the construction and arrangement of a corn-planter, as will be hereinafter more fully set forth.

The annexed drawing, to which reference is made, fully illustrates our invention.

A represents the frame of our planter, having suitable boxes at its rear end for the passage of the axle B, on the ends of which the wheels C C are placed. These wheels are placed loosely on the axle, and between each wheel and the frame is a laterally-movable clutch, D, feathered to the axle. The clutches D D are provided with circumferential flanges $a\ a$, over which are placed slotted caps $D^1 D^1$. These caps are, by means of rods $b\ b$, connected with a lever, $D^2$, pivoted on the back part of the frame, the rods being connected to said lever one on each side of the pivot-point and at equal distances from the same, so that by moving the lever $D^2$ in one direction both the clutches D D will be thrown in gear with the wheels C C, and by moving the lever in the opposite direction both clutches will be withdrawn from the wheels. The lever is held in either position by a pin, $d$, inserted in holes in a cross-bar in the frame.

E is a platform, secured on the front part of the frame A, and supporting at each end a seed-box or hopper, G, in front of the wheels C. Over the bottom of each box G is a metal-lined slide, $G^1$, having an aperture, $e$, in its rear end, in which the corn is carried out in rear of the box and dropped into the ground. These slides are attached to a cross-bar, $G^2$, forming part of a frame, H, which is held in suitable guides under the main frame A, so as to be movable back and forth. This frame is pressed backward by means of a spring, I, so that its rear end will press against two cams, J J, secured on the axle B.

When the machine is thrown in gear, as above described, the cams J rotate with the axle and force the frame H forward. Then, as soon as the cams J clear the frame, the spring I throws the frame suddenly backward and drops the corn. The cams J being double, two hills of corn are dropped for each revolution of the axle B.

What we claim as new, and desire to secure by Letters Patent, is—

In a corn-planter, the combination of the horizontal sliding frame H, carrying the metal-lined horizontal slides $G^1$, having apertures $e$, with the slotted seed-boxes G, spring I, axle B, carrying the loose driving-wheels C C, cams J J, and clutches D D, connected by the rods $b\ b$ with the lever $D^2$, all constructed, arranged, and operating in the manner and for the purpose set forth.

In testimony that we claim the above we have hereunto subscribed our names in the presence of two witnesses.

ENOCH P. TERRELL.
JOHN FOOS.

Witnesses:
QUINCY GWYNN,
E. J. HOWENSTINE.